US007975257B2

(12) United States Patent
Fanning et al.

(10) Patent No.: US 7,975,257 B2
(45) Date of Patent: Jul. 5, 2011

(54) ITERATIVE STATIC AND DYNAMIC SOFTWARE ANALYSIS

(75) Inventors: Michael C. Fanning, Redmond, WA (US); Nicholas Guerrera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1238 days.

(21) Appl. No.: 11/451,851

(22) Filed: Jun. 13, 2006

(65) Prior Publication Data
US 2007/0288899 A1  Dec. 13, 2007

(51) Int. Cl.
G06F 9/44  (2006.01)
(52) U.S. Cl. .................... 717/124; 717/107; 717/111
(58) Field of Classification Search .................. None
See application file for complete search history.

(56) References Cited

U.S. PATENT DOCUMENTS

| | | | | |
|---|---|---|---|---|
| 4,853,851 A | 8/1989 | Horsch | ............ | 364/300 |
| 5,317,740 A | 5/1994 | Sites | ............ | 395/700 |
| 5,485,409 A * | 1/1996 | Gupta et al. | ............ | 726/25 |
| 5,522,036 A | 5/1996 | Shapiro | ............ | 395/183.14 |
| 5,909,577 A | 6/1999 | Devanbu | ............ | 395/704 |
| 6,754,612 B1 * | 6/2004 | Vanfladern et al. | ............ | 702/186 |
| 6,789,054 B1 * | 9/2004 | Makhlouf | ............ | 703/6 |
| 6,892,297 B1 * | 5/2005 | Aguilar et al. | ............ | 713/2 |
| 6,968,341 B2 | 11/2005 | Hand et al. | | |
| 7,032,214 B1 * | 4/2006 | Rodrigues et al. | ............ | 717/130 |
| 7,558,719 B1 * | 7/2009 | Donlin | ............ | 703/14 |
| 2003/0110007 A1 | 6/2003 | McGee et al. | | |
| 2004/0088687 A1 | 5/2004 | Dalton et al. | ............ | 717/141 |
| 2004/0181677 A1 | 9/2004 | Hong et al. | ............ | 713/188 |
| 2005/0015752 A1 | 1/2005 | Alpern et al. | ............ | 717/131 |
| 2005/0108562 A1 | 5/2005 | Khazan et al. | ............ | 713/200 |
| 2005/0193353 A1 * | 9/2005 | Malekkhosravi et al. | ......... | 716/1 |
| 2005/0198526 A1 | 9/2005 | Marr et al. | ............ | 713/200 |
| 2005/0273777 A1 | 12/2005 | Grover et al. | ............ | 717/151 |
| 2006/0123384 A1 | 6/2006 | Nickell et al. | | |
| 2007/0250806 A1 * | 10/2007 | Mejri et al. | ............ | 717/100 |
| 2007/0283326 A1 * | 12/2007 | Consolatti et al. | ............ | 717/124 |

FOREIGN PATENT DOCUMENTS

| | | |
|---|---|---|
| CA | 2518498 | 9/2004 |
| WO | WO 01/01256 | 1/2001 |

OTHER PUBLICATIONS

Mitchell, A.. et al., "A Study of the Influence of Coverage on the Relationship between Static and Dynamic Coupling Metrics", Science of Computer Programming, 2006, 59, 4-25.

Arisholm, E. et al., "Dynamic Coupling Measurement for Object-Oriented Software", *IEEE Transactions on Software Engineering*, 2004, 30(8), 491-506.

(Continued)

*Primary Examiner* — Tuan Q Dam
*Assistant Examiner* — Zheng Wei
(74) *Attorney, Agent, or Firm* — Woodcock Washburn LLP

(57) ABSTRACT

Static and dynamic code analyses are seamlessly, iteratively performed. A software analysis tool integrates the results of dynamic and static analysis and iteratively utilizes results from a previous analysis, or analyses, to augment a current analysis. During a debugging process, information collected at runtime is integrated with static code analysis results. This information is generated and stored as part of the results of the testing and debugging processes. The stored information is subsequently utilized to provide improved analysis results. The software analysis tool eliminates the need for software developers to separately perform static analysis and dynamic analysis.

18 Claims, 4 Drawing Sheets

OTHER PUBLICATIONS

Rilling, J. et al., "The *CONCEPT* Project-Applying Source Code Analysis to Reduce Information Complexity of Static and Dynamic Visualization Techniques", *Proceedings of the 1st International Workshop on Visualizing Software for Understanding and Analysis*, 2002, 10 pages.

Sneed, H.M., "Reverse Engineering of Test Cases for Selective Regression Testing", Proceedings of the Eight European Conference on Software Maintenance and Reengineering, Tampere, Finland, Mar. 24-26, 2004, 6 pages.

Xiao, S. et al., "Performing High Efficiency Source Code Static Analysis with Intelligent Extensions", Proceedings of the 11th Asia-Pacific Software Engineering Conference, Busan, Korea, Nov. 30-Dec. 3, 2004, Published in Jan. 2004, 10 pages.

* cited by examiner

ITERATIVE STATIC AND DYNAMIC SOFTWARE ANALYSIS

TECHNICAL FIELD

The technical field is generally related to computing systems and more specifically related to development of software for computing systems.

BACKGROUND

Typical software analysis tools provide the ability to independently analyze software code statically and dynamically. Static analysis can identify correctness issues in code without actually executing that code, through techniques such as data flow analysis, value tracking, and the like. Static analysis is limited, however, by the information that is available through static inspection of compiled binary code. Dynamic analysis can provide information pertaining to timing and how much memory is allocated, for example. Software developers often independently perform static analysis and dynamic analysis, during the software development process, attempting to apply results of one type of analysis to the other.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A software analysis tool seamlessly provides both static and dynamic code analysis. Information obtained by executing code is collected, published, and leveraged during static analysis in order to enable new analysis and to focus the results of the analysis to a set that is provably meaningful based on runtime behavior. The software analysis tool integrates the results of dynamic and static analysis and iteratively utilizes results from a previous analysis, or analyses, to augment a current analysis. The software analysis tool eliminates the need for software developers to separately perform static analysis and dynamic analysis. In an example embodiment, during a debugging process, the code being analyzed is executed. Results from previous static and dynamic analyses are integrated to augment the debugging process. The results of the debugging process indicate both static analysis results and dynamic analysis results.

BRIEF DESCRIPTION OF THE DRAWINGS

The foregoing summary, as well as the following detailed description, is better understood when read in conjunction with the appended drawings. For the purpose of illustrating coupled, iterative dynamic and static software analyses there is shown in the drawings exemplary constructions thereof; however, iterative dynamic and static software analyses is not limited to the specific methods and instrumentalities disclosed.

DETAILED DESCRIPTION OF ILLUSTRATIVE EMBODIMENTS

Figure 1:
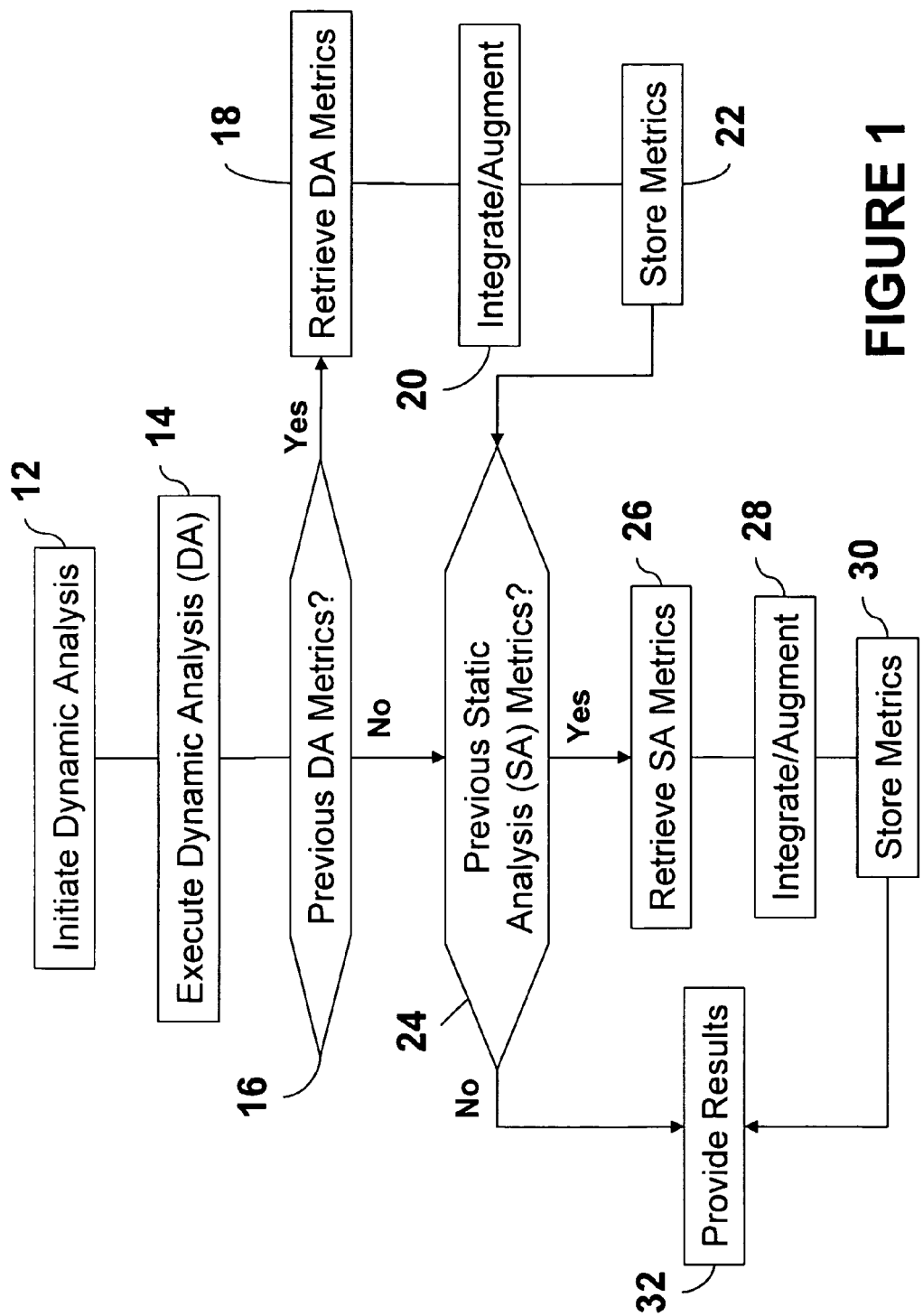
FIG. 1 is a flow diagram of an exemplary process for providing iterative dynamic and static software analysis.

During a debugging process, static and dynamic software analyses results are integrated. Information collected at runtime is integrated with static code analysis results. This information is generated and in an example embodiment, persisted to a disk as an incidental outcome of the testing and debugging processes. The stored information is subsequently utilized to provide improved analysis results.

In an example embodiment, at build time, static analysis is invoked. In its initial state, the static analysis is tuned to minimize noise. That is, wherever information is not sufficiently complete to guarantee a high-certainty result (or is altogether absent), analysis will not occur. As an incidental outcome to building the code, the application is instrumented to collect certain metrics at runtime. This information is collected dynamically, anytime a user runs an application, including debugging scenarios. In this example embodiment, at runtime, certain data is collected dynamically and persisted to a store. During a subsequent static analysis, this information is recovered and used to refine static analysis results to a set of low-noise, high-value messages and/or enable an entirely new analysis that occurs statically but is only possible if metrics collected dynamically are available.

For example, in an exemplary scenario, a static analysis tool contains a check that detects an inefficiency in object code or, in the case of managed analysis, IL (intermediate language). The check is not enabled by default, because the pattern of the inefficiency will likely be detected in hundreds of places and, in the majority of cases, resolving any individual violation will not result in a meaningful performance gain, and therefore is not worth the time to fix or the increased risk of introducing a code defect. In this example scenario, at build time, the code is instrumented to record the number of calls that occur to individual methods or functions. The user executes the code, and these metrics are collected. During a subsequent analysis gesture, the inefficiency detection check described above fires against a method. The static analysis phase looks up the analysis target method in the repository and notes that it is, relative to other methods/functions in the application, frequently called. The static analysis check surfaces the violation to the user, as it has now been determined that this problem is likely to result in a meaningful performance gain if it is addressed.

In another example scenario, a check exists that verifies something interesting for call sites. For example, the check could attempt to determine whether the call site will de-reference a parameter. If so, the static checker could alert users who provably pass a potentially null item to this call site, which could result in a crash at runtime. This check cannot analyze virtual call sites because the call site only references the virtual declaration of the method. That is, the IL contains a generalized reference to a definition; it does not reference any specific concrete implementation that provides the definition. During runtime, the specific sub-class that implements a virtual method is detected and associated with the general reference that exists in IL. During a subsequent static analysis, the check cited previously can retrieve the specific implementation that has been provably associated with a general call site, and subject that specific implementation to its check.

FIG. 1 is a flow diagram of an exemplary process for providing iterative dynamic and static software analysis. In an example embodiment, as depicted in FIG. 1, dynamic software analysis is performed and the results of the dynamic analysis are augmented with previously stored static analysis results. Dynamic software analysis is initiated at step 12. The dynamic software analysis (DA) is executed at step 14. Dynamic software analysis can be performed by any appropriate dynamic software analysis tool. For example, dynamic analysis can be performed utilizing a software development tool, such as MICROSOFT® VISUAL STUDIO. During dynamic software analysis, the software being analyzed, or a portion thereof, is executed and runtime analysis is performed. Results from the dynamic software analysis can include timing information such as, the amount of time that was required to perform an operation and/or to run a portion (segment) of the software being analyzed, for example. Example dynamic software analysis metrics include the frequency with which a call is executed, the empiric time required to execute a function, a definition of a method associated with a virtual call site, and if on execution a call allocates memory.

In an example embodiment, the frequency with which a call is executed is used to refine a static analysis performance check that it is high-certainty and fires frequently. In this case, it is advantageous to narrow the results to that set of analysis targets which are frequently called. The time to fix for infrequently called items does not warrant the benefit, as the incremental performance gain will be small. Code changes also introduce a risk of regression, which is another reason to focus the results on the most meaningful set.

In an example scenario, a user may want to specify that a method or function is performance-sensitive. That is, the method or call is desired to execute within a certain threshold of time. The actual empiric time required to execute a function can be utilized to determine if, at runtime, the time-to-execute exceeds that threshold. And, the results can be published in a subsequent static analysis run. The static analysis could also indicate what call sites were responsible for the time spent in execution.

Static analysis that needs access to a specific call site implementation cannot operate against a virtual call site. The specific concrete method definition associated with a virtual call site can be determined and used to augment the static analysis. Information, such as the specific subclasses bound to a virtual call site can be provided to the static analysis.

In an example scenario, it may be desired to know if memory is allocated during execution. Whether memory allocation occurs can be difficult and in some cases impossible to determine statically. For example, memory allocation resulting from a call to a virtual method can not be determined via static analysis. This information can be collected dynamically, and provided to subsequent static analysis.

It is determined, at step 16, if metrics from a previous dynamic software analysis were stored. The metrics could be for the same software entity being dynamically analyzed or for a version of the software entity being analyzed. For example, during code development, a first version of a software component could be dynamically analyzed and selected (or all) metrics resulting therefrom could be stored in memory. Subsequently, changes to the software module could be made resulting in another version of the software module. When the subsequent version of the software is dynamically analyzed (e.g., step 14), it could be determined (e.g. step 16) that metrics from the dynamic analysis from the previous version of the software module were stored. Metrics from a previous dynamic analysis could include metrics from a previous augmented and/or non-augmented dynamic analysis. That is, the metrics from a previous dynamic analysis could include metrics from a dynamic analysis that was augmented by static analysis, metrics from a dynamic analysis that was augmented by a previous dynamic analysis, metrics from a non-augmented dynamic analysis, or a combination thereof.

In an example embodiment, static analysis occurs against code that calls into other binaries which are not themselves being statically analyzed. If dynamically-acquired data exists for those dependencies, however, the static analysis of the target binary makes use of that information to verify its client usage.

If metrics from a previous dynamic software analysis for the same software entity, or a version thereof, were stored (step 16), the stored metrics are retrieved at step 18. Metrics can be stored on any appropriate storage medium, such as magnetic storage, optical storage, a hard disk, semiconductor memory, flash memory, or the like, for example. The retrieved metrics are integrated with the current dynamic analysis to augment the current analysis at step 20.

In an example embodiment, for the sake of efficiency, a mechanism is implemented to restrict runtime collection based on the static analysis. For example, a user can indicate that the user is interested in analyzing a specific type or a specific method in a type. At runtime, dynamic data collection could be disabled entirely, unless it's proven that the code being executed is reachable from the targets that will be analyzed statically.

Metrics from the augmented results are stored at step 22, and the process proceeds to step 24. For example, during code development, a first version of a software entity could include a call to a network site that does not exist at the time the first version was dynamically analyzed. Thus, the call to the site would be treated as a virtual call and metrics, such as timing and memory allocation, would be estimated during the dynamic analysis of the first version. Subsequently, the site could be completed, and subsequent dynamic analysis of the software entity would include metrics, such as timing and memory allocation, associated with calling the actual network site.

If metrics from a previous dynamic software analysis for the same software entity, or a version thereof, were not stored (step 16), it is determined, at step 24, if metrics from a previous static software analysis for the same software entity, or a version thereof, were stored. Metrics from a previous static analysis could include metrics from a previous augmented and/or non-augmented static analysis. That is, the metrics from a previous static analysis could include metrics from a static analysis that was augmented by dynamic analysis, metrics from a static analysis that was augmented by a previous static analysis, metrics from a non-augmented static analysis, or a combination thereof. Static analysis is performed on software without executing the software. Static analysis can be performed on source code and/or object code. Results from static analysis can include the number of lines of code in the software, possible coding error (e.g., improper syntax), maintainability metrics, program semantic errors, logical errors, cyclomatic complexity (Cyclomatic complexity is a broad measure of soundness and confidence of a program. Cyclomatic complexity provides a single ordinal number that can be utilized for comparison with the complexity of other programs.), or the like, for example. Another example static analysis metrics can include simple configuration details static settings that indicate whether analysis/runtime collection should be enabled for a binary, a type, a method. Yet another example static analysis metric can include the complexity of the code.

If no previous static analysis metrics were stored (step 24), the results of the current dynamic analysis are provided at step 32. If previous static analysis metrics were stored (step 28), the metrics are retrieved at step 26. The retrieved metrics are integrated with the results of the current dynamic analysis to augment the current dynamic analysis at step 28. Metrics from the integrated results are stored at step 34 and the results are provided at step 32.

Figure 2:
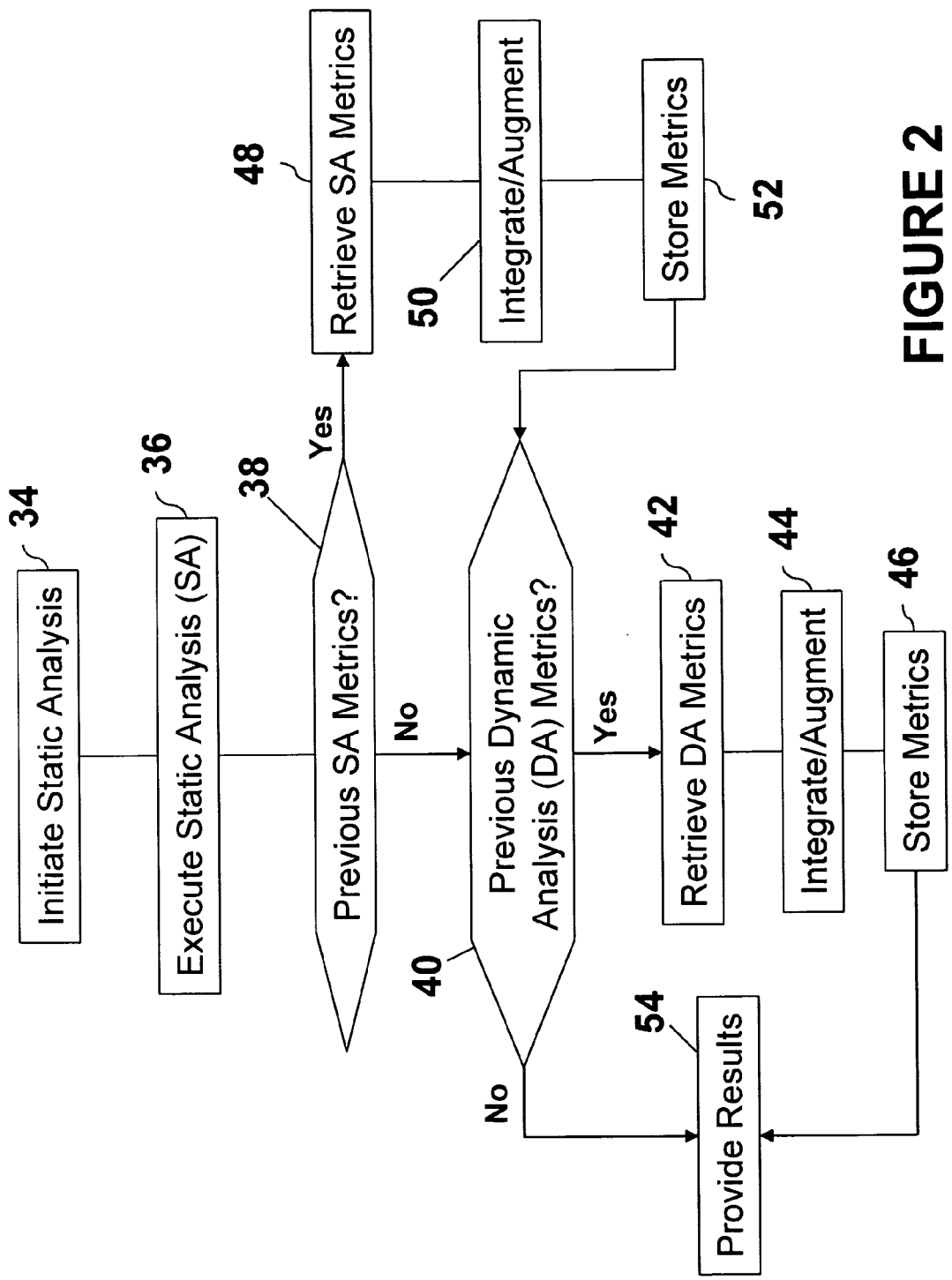
FIG. 2 is a flow diagram of another exemplary process for providing iterative dynamic and static software analysis.

FIG. 2 is a flow diagram of another exemplary process for providing iterative dynamic and static software analysis. In an example embodiment, as depicted in FIG. 2, static software analysis is performed and the results of the static analysis are augmented with previously stored static dynamic results. Static software analysis is initiated at step 34. The static software analysis (SA) is executed at step 36. Static software analysis can be performed by any appropriate static software analysis tool. During static software analysis, the software being analyzed, or a portion thereof, is analyzed without executing the software being analyzed.

It is determined, at step 38, if metrics from a previous static software analysis were stored. As described above, metrics from a previous static analysis could include metrics from a previous augmented and/or non-augmented static analysis. The metrics could be for the same software entity being statically analyzed or for a version of the software entity being analyzed. For example, during code development, a first version of a software component could be statically analyzed and selected (or all) metrics resulting therefrom could be stored in memory. Subsequently, changes to the software module could be made resulting in another version of the software module. When the subsequent version of the software is statically analyzed (e.g., step 36), it could be determined (e.g. step 38) that metrics from the static analysis from the previous version of the software module were stored.

If metrics from a previous static software analysis for the same software entity, or a version thereof, were stored (step 38), the stored metrics are retrieved at step 48. The retrieved metrics are integrated with the current static analysis to augment the current static analysis at step 50. Metrics from the integrated results are stored at step 52. The process proceeds to step 40.

If metrics from a previous static software analysis for the same software entity, or a version thereof, were not stored (step 38), it is determined, at step 40, if metrics from a previous dynamic software analysis for the same software entity, or a version thereof, were stored. As described above, metrics from a previous dynamic analysis could include metrics from a previous augmented and/or non-augmented dynamic analysis. If no previous dynamic analysis metrics were stored (step 40), the results of the current static analysis are provided at step 54. If previous dynamic analysis metrics were stored (step 40), the metrics are retrieved at step 42. The retrieved metrics are integrated with the results of the current static analysis to augment the current static analysis at step 44. Metrics from the integrated results are stored at step 46 and the results are provided at step 54.

Figure 3:
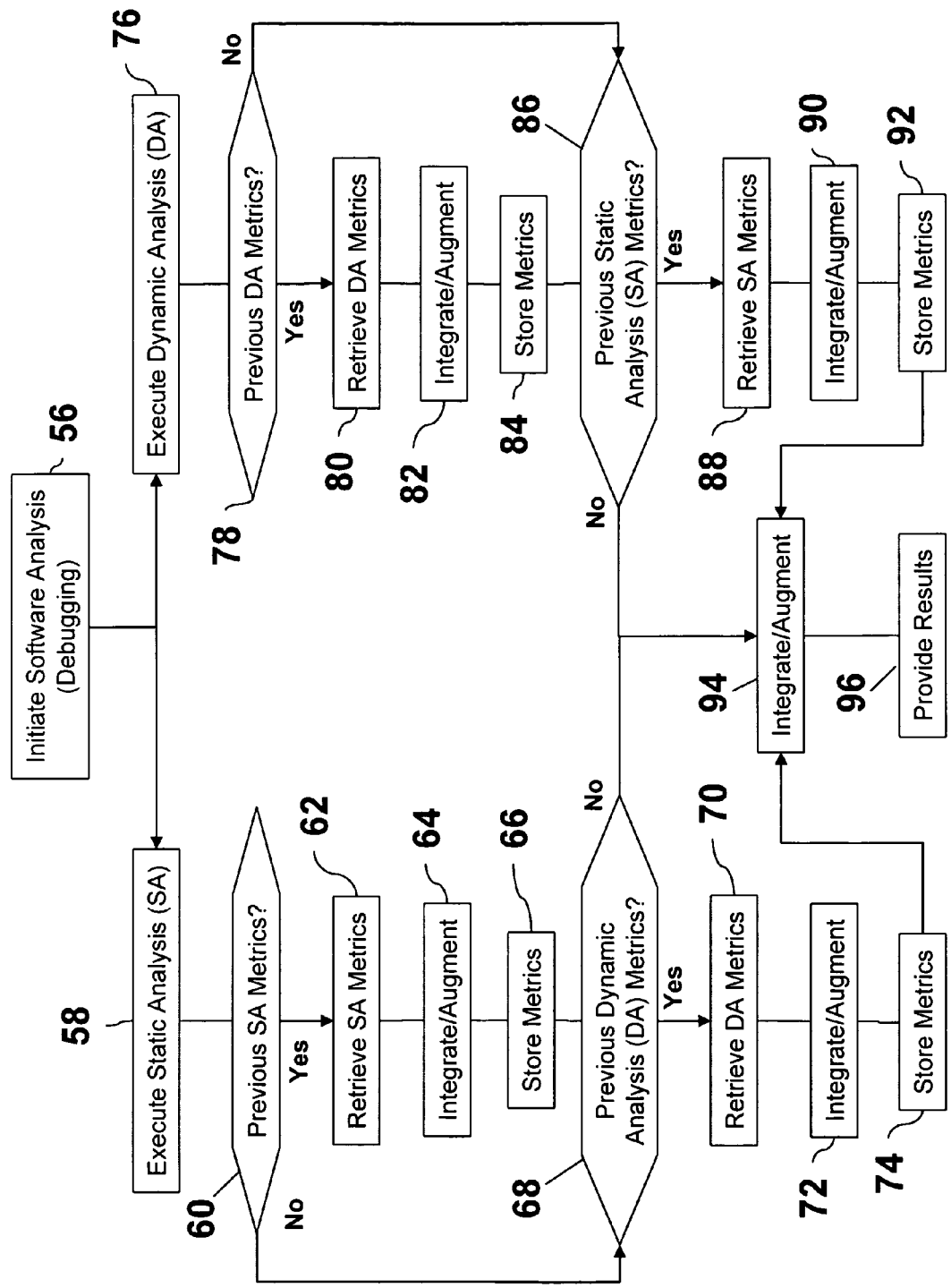
FIG. 3 is a flow diagram of an example process for iteratively, dynamically and statically, analyzing software as part of a debugging process.

In an example embodiment, a user/software developer can start a debugging process and static and dynamic analysis is performed seamlessly in the background. FIG. 3 is a flow diagram of an example process for dynamically and statically, iteratively, analyzing software as part of a debugging process. The process depicted in FIG. 3 is basically a combination of the processes depicted in FIG. 1 and FIG. 2. Software analysis is initialized at step 56. Subsequently, static analysis is performed (step 58) and dynamic analysis is performed (step 80). Static and dynamic analyses are performed in response to initializing software analysis. Static and dynamic analysis can be performed concurrently or sequentially in any order. At step 60, it is determined if metrics from a previous static software analysis were stored. As described above, metrics from a previous static analysis could include metrics from a previous augmented and/or non-augmented static analysis. The metrics could be for the same software entity being statically analyzed or for a version of the software entity being analyzed.

If metrics from a previous static software analysis for the same software entity, or a version thereof, were stored (step 60), the stored metrics are retrieved at step 62. The retrieved metrics are integrated with the current static analysis to augment the current static analysis at step 64. Metrics from the integrated results are stored at step 66. At this point, the process proceeds to step 68. If metrics from a previous static software analysis for the same software entity, or a version thereof, were not stored (step 60), it is determined, at step 68, if metrics from a previous dynamic software analysis for the same software entity, or a version thereof, were stored. As described above, metrics from a previous dynamic analysis could include metrics from a previous augmented and/or non-augmented dynamic analysis. If previous dynamic analysis metrics were stored (step 68), the metrics are retrieved at step 70. The retrieved metrics are integrated with the results of the current static analysis to augment the current static analysis at step 72 and the metrics from the integrated results are stored at step 74. At this point, the process proceeds to step 94. Also, if no previous dynamic analysis metrics were stored (step 68), the process proceeds to step 94. At step 94, the static analysis is integrated with the dynamic analysis to synergistically augment the results of each type of analysis. The augmented results are provided at step 96.

Dynamic software analysis is executed at step 76. It is determined, at step 78, if metrics from a previous dynamic software analysis were stored. The metrics could be for the same software entity being dynamically analyzed or for a version of the software entity being analyzed. If metrics from a previous dynamic software analysis were stored (step 78), the stored metrics are retrieved at step 80. The retrieved metrics are integrated with the current dynamic analysis to augment the current analysis at step 82. Metrics from the augmented results are stored at step 84, and the process proceeds to step 86. If metrics from a previous dynamic software analysis for the same software entity, or a version thereof, were not stored (step 78), it is determined, at step 86, if metrics from a previous static software analysis for the same software entity, or a version thereof, were stored. Metrics from a previous static analysis could include metrics from a previous augmented and/or non-augmented static analysis. If no previous static analysis metrics were stored (step 86), the process proceeds to step 94 as described above. If previous static analysis metrics were stored (step 86), the metrics are retrieved at step 88. The retrieved metrics are integrated with the results of the current dynamic analysis to augment the current dynamic analysis at step 90. Metrics from the augmented dynamic analysis are stored at step 92 and the process proceeds to step 94 as described above.

Figure 4:
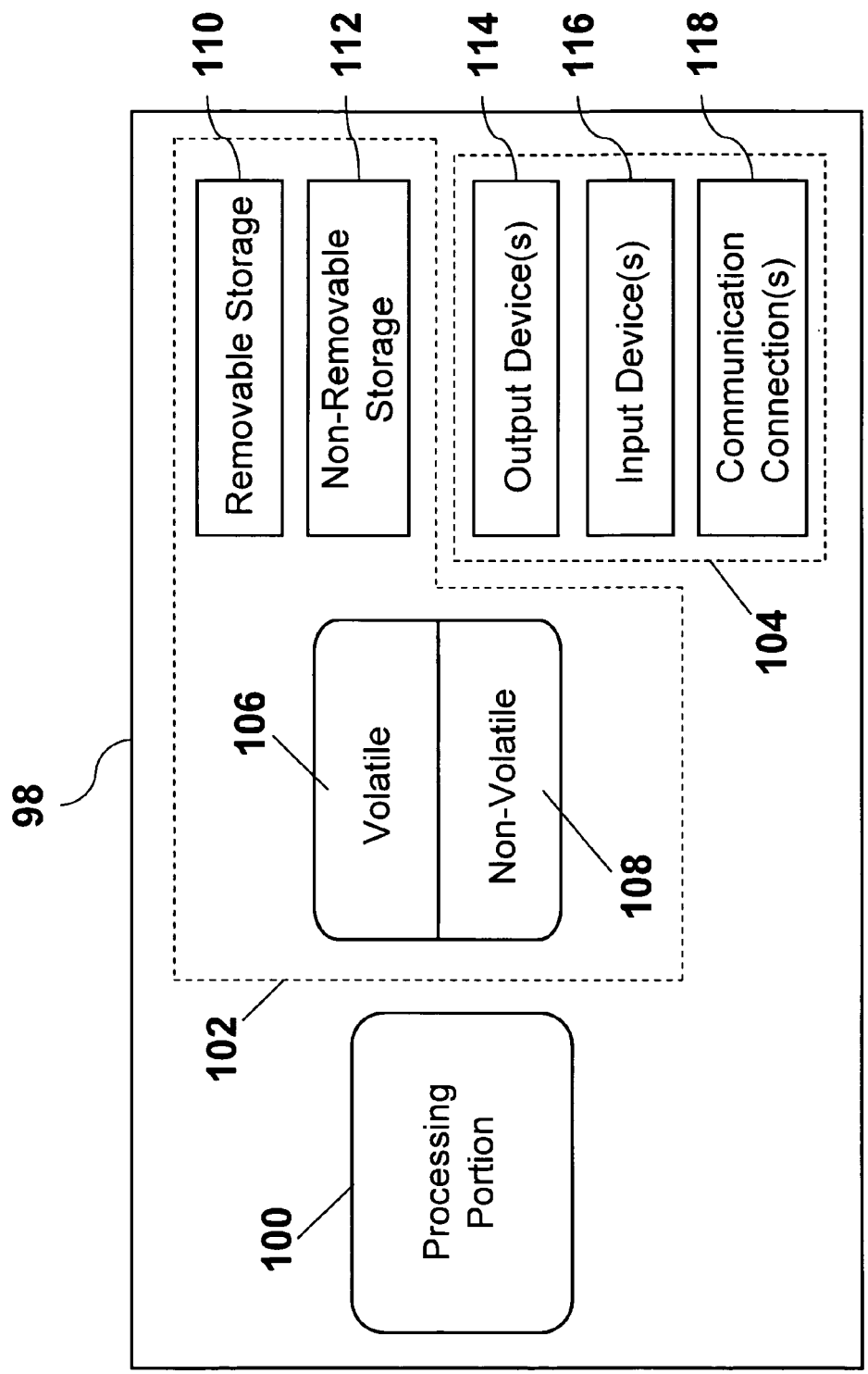
FIG. 4 is a diagram of an example system for iteratively, dynamically and statically, analyzing software.

FIG. 4 is a diagram of an example system 98 for iteratively, dynamically and statically analyzing software. As described above, in an example embodiment an analysis system 98 integrates information collected at runtime with static code analysis checks. On enabling, interim builds are instrumented to collect useful information and execution characteristics that are available at runtime. This information is generated and stored as a result of the testing and debugging process. The system 98 can be implemented as a client processor and/or a server processor. The system 98 comprises a processing portion 110, a memory portion 102, and an input/output portion 104. The processing portion 100, memory portion 102, and input/output portion 104 are coupled together (coupling not shown in FIG. 4) to allow communications therebetween. The system 98 can comprise a distributed processor and each portion of the system 98 (e.g., the processing portion 100, the memory portion 102, and the input/output portion 104) can comprise distributed processors. The system 98 is capable of performing the operations associated with iteratively analyzing software via static and dynamic software analysis. For example, the processing portion 100 is capable of executing static software analysis, executing dynamic software analysis, retrieving static and dynamic software analysis metrics from storage, storing static and dynamic software analysis metrics, and integrating dynamic software analysis and static software analysis to augment static and/or dynamic software analysis. The memory portion 102 is capable of storing all parameters associated with iteratively, dynamically and statically analyzing software. In an example embodiment, the memory portion 102 stores the metrics resulting from static software analysis and dynamic software analysis, and augmented software analysis.

The Input/output portion 104 is capable of providing and/or receiving components, as describe above, utilized to iteratively, dynamically and statically analyzing software. The input/output portion 104 can provide data to and receive data from another system, a storage device, and/or a data stream. The input/output portion 104 is capable of receiving inputs to various types of software analysis and providing results of various types of software analysis.

Depending upon the exact configuration and type of processor, the memory portion 102 can be volatile (such as RAM and/or cache) 106, non-volatile (such as ROM, flash memory, etc.) 108, or a combination thereof. The system 98 can have additional features/functionality. For example, the system 98 can include additional storage (removable storage 110 and/or non-removable storage 112) including, but not limited to, magnetic or optical disks, tape, flash, smart cards or a combination thereof. Computer storage media, such as memory portion 102, 106, 108, 110, and 112, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the system 98. Any such computer storage media can be part of the system 98.

The system 98 also can contain communications connection(s) 118 that allow the system 98 to communicate with other devices. Communications connection(s) 118 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The system 98 also can have input device(s) 116 such as keyboard, mouse, pen, voice input device, touch input device, etc. Output device(s) 114 such as a display, speakers, printer, etc. also can be included.

While it is envisioned that numerous embodiments of iterative, dynamic and static software analysis is particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for iterative, dynamic and static software analysis, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for iteratively, dynamically and statically analyzing software.

The program(s) can be implemented in assembly or machine language, if desired. In any case, the language can be a compiled or interpreted language, and combined w iterative, dynamic and static software analysis also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for iterative, dynamic and-static software analysis. When implemented on a general-purpose processor, the program code combines with the processor to provide a unique apparatus that operates to invoke the functionality of iterative, dynamic and static software analysis. Additionally, any storage techniques used in connection with iterative, dynamic and static software analysis can invariably be a combination of hardware and software.

While iterative, dynamic and static software analysis has been described in connection with the example embodiments of the various figures, it is to be understood that other similar embodiments can be used or modifications and additions can be made to the described embodiments for performing the same functions for iterative, dynamic and static software analysis without deviating therefrom. Therefore, iterative, dynamic and static software analysis as described herein should not be limited to any single embodiment, but rather should be construed in breadth and scope in accordance with the appended claims.

What is claimed:

1. A method for analyzing software, the method comprising:
   executing dyamnic analysis for dynamically analyzing a software entity while the software entity is executing;
   determining whether a dynamic metric indicative of a result of a previous dynamic analysis of one of the software entity and a version of the software entity is stored on a storage medium;

if the dynamic metric is stored on the storage medium, retrieving the dynamic metric from the storage medium;
augmenting the retrieved dynamic metric in accordance with a result of the dynamic analysis;
determining whether a static metric indicative of a result of a previous static analysis of the one of the software entity and a version of the software entity is stored on a storage medium;
if the static metric is stored on the storage medium, retrieving the static metric;
augmenting the retrieved static metric with the dynamic analysis of the software entity;
using the augmented static metric to restrict the dynamic analysis; and
storing at least one augmented metric resulting from integrating the retrieved static metric into the dynamic analysis of the software entity.

2. The method of claim 1, further comprising storing at least one dynamic metric from the dynamic analyses of the software entity prior to integrating.

3. The method of claim 2, further comprising using the at least one dynamic metric with at least one of:
a subsequent dynamic analysis of at least one of the software entity and a version of the software entity; and
a subsequent static analysis of at least one of the software entity and a version of the software entity.

4. The method of claim 1, further comprising using the at least one augmented metric with at least one of:
a subsequent dynamic analysis of at least one of the software entity and a version of the software entity; and
a subsequent static analysis of at least one of the software entity and a version of the software entity.

5. The method of claim 1, wherein the dynamic metric comprises at least one of how often a portion of the software entity is executed during execution of the software entity, a range of values of a parameter in the software entity, an amount of memory utilized by execution of a portion of the software entity, and an execution time for executing a portion of the software entity.

6. The method of claim 1, wherein the static metric comprises at least one of a number of lines of code in the software entity, cyclomatic complexity, and a range of values of a parameter in the software entity.

7. A method for analyzing software, the method comprising:
statically analyzing a software entity during a build process;
determining whether a static metric indicative of a result of a previous static analysis of one of the software entity and a version of the software entity is stored on a storage medium;
if the static metric is stored on the storage medium, retrieving the static metric from the storage medium;
augmenting the retreived static metric with a result of the static analysis;
determning whether a dynamic metric indictive of a result of a previous dynamic analysis of the one of the software entity and the version of the software entity is stored on a storage medium;
if the dynamic metric isstored on the storage medium, retrieving the dynamic metric indicative of a result of a previous dynamic analysis of one of the software entity and the version of the software entity, the previous dynamic analysis having been performed during execution of the one of the software entity and the version of the software entity;
augmenting the retrieved dynamic metric into the static analysis of the software entity;
using the augmented dynamic metric to refine the static anaylsis during the build process by identifying at least one analysis target; and
storing at least one augmented metric resulting from integrating the retrieved dynamic metric into the static analyses of the software entity.

8. The method of claim 7, further comprising storing at least one static metric from the result of the static analysis of the software entity prior to integrating.

9. The method of claim 8, wherein the at least one static metric is stored for use with at least one of:
a subsequent dynamic analysis of at least one of the software entity and a version of the software entity; and
a subsequent static analysis of at least one of the software entity and a version of the software entity.

10. The method of claim 7, wherein the at least one augmented metric is stored for use with at least one of:
a subsequent dynamic analysis of at least one of the software entity and a version of the software entity; and
a subsequent static analysis of at least one of the software entity and a version of the software entity.

11. The method of claim 7, wherein a dynamic metric comprises at least one of how often a portion of the software entity is executed during execution of the software entity, range of values of a parameter in the software entity, an amount of memory utilized by execution of a portion of the software entity, and execution time for executing a portion of the software entity.

12. The method of claim 7, wherein the static metric comprises at least one of a number of lines of code in the software entity, a cyclomatic complexity, and a range of values of a parameter in the software entity.

13. A system for analyzing software, the system comprising:
a processing portion for:
dynamically analyzing a software entity while the software entity is executing;
determining whether a dynamic metric indicative of a result of a previous dynamic analysis of one of the software entity and a version of the software entity is stored in a memory portion;
if the dynamic metric is stored on the memory portion, retrieving the dynamic metric from the memory portion;
using the retrieved dynamic metric to refine a static analysis of one of the software entity and the version of the software entity performed during a build process by identifying at least one analysis target;
retrieving, from the memory portion, at least one static metric indicative of a result of a previous static analysis of one of the software entity and a version of the software entity;
integrating the retrieved at least one static metric into the dynamic analysis of the software entity; and
storing, in the memory portion, at least one augmented dynamic metric resulting from integrating the retrieved at least one static metric into the dynamic analysis of the software entity; and
the memory portion for:
storing the at least one static metric indicative of the result of the previous static analysis; and
storing the at least one augmented dynamic metric.

14. The system of claim 13,
the processing portion further for:
statically analyzing the software entity;

determining whether a static metric indicative of a result of a previous static analysis of one of the software entity and a version of the software entity is stored in the memory portion;

if the static metric is stored on the storage medium, retrieving the static metric from the memory portion;

using the static metric to restrict a dynamic analysis of one of the software entity and the version of the software entity by disabling the dynamic analysis for a portion of the one of the software entity and the version of the software entity;

retrieving, from the memory portion, at least one dynamic metric indicative of a result of a previous dynamic analysis of one of the software entity and a version of the software entity;

integrating the retrieved at least one dynamic metric into the static analyses of the software entity;

refining the static analysis performed during a build process by identifying at least one analysis target; and storing, in the memory portion, at least one augmented static metric resulting from integrating the retrieved at least one dynamic metric into the static analyses of the software entity; and the memory portion further for:

storing the at least one dynamic metric indicative of the result of the previous dynamic analysis; and storing the at least one augmented static metric.

15. The system of claim 14, the processing portion further for storing, in the memory portion, at least one of:

at least one static metric from the result of the static analysis of the software entity prior to integrating the retrieved at least one dynamic metric into the static analyses; and at least one dynamic metric from the result of the dynamic analysis of the software entity prior to integrating the retrieved at least one static metric into the dynamic analysis.

16. The system of claim 15, wherein at least one of the stored static metric, the stored dynamic metric, the stored augmented static metric, and the stored augmented dynamic metric is stored for use with at least one of:

a subsequent dynamic analysis of at least one of the software entity and a version of the software entity; and a subsequent static analysis of at least one of the software entity and a version of the software entity.

17. The system of claim 13, wherein a static metric comprises at least one of a number of lines of code in the software entity, a cyclomatic complexity, and a range of values of a parameter in the software entity.

18. The system of claim 13, wherein the dynamic metric comprises at least one of how often a portion of the software entity is executed during execution of the software entity, a range of values of a parameter in the software entity, an amount of memory utilized by execution of a portion of the software entity, and an execution time for executing a portion of the software entity.

* * * * *